Jan. 8, 1924.  
J. ARTESE  
1,480,141
WATER DISTRIBUTING AND REGULATING DEVICE
Filed June 16, 1921
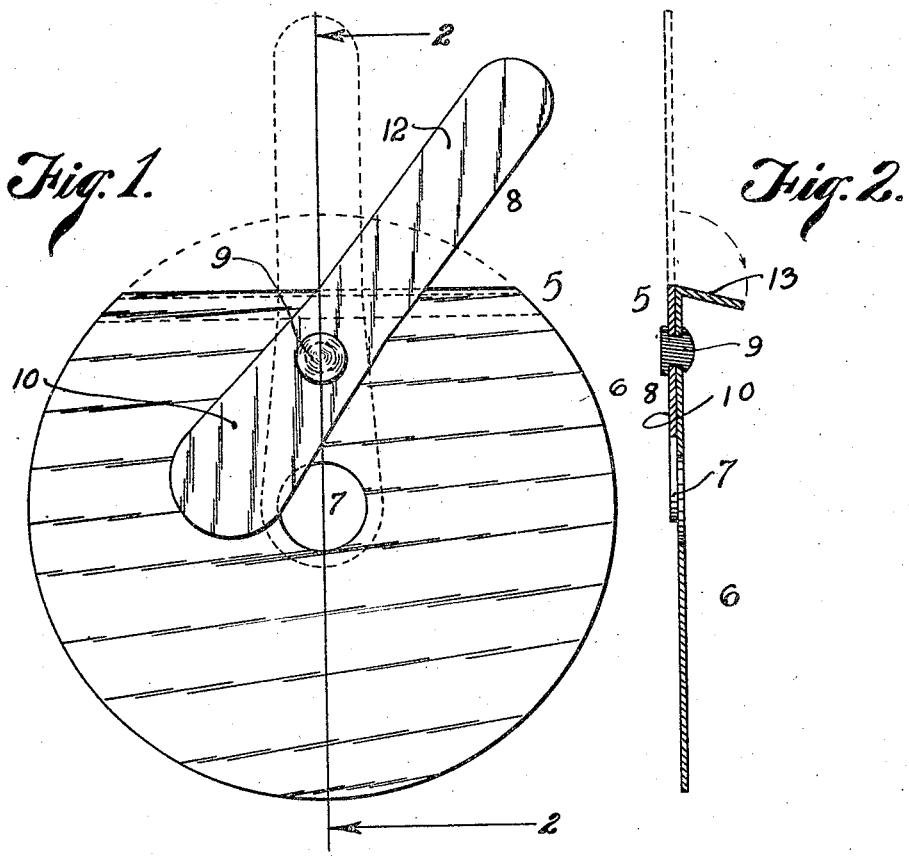
Fig. 1.  
Fig. 2.
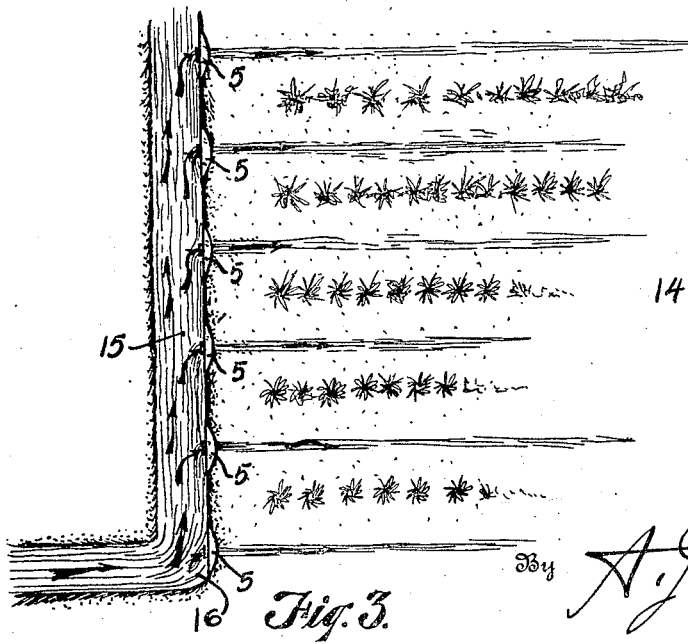
Fig. 3.
Inventor  
Joseph Artese.  
By  
Attorney Patented Jan. 8, 1924.

1,480,141

UNITED STATES PATENT OFFICE.

JOSEPH ARTESE, OF WHEATRIDGE, COLORADO.

WATER DISTRIBUTING AND REGULATING DEVICE.

Application filed June 16, 1921. Serial No. 477,946.

*To all whom it may concern:*

Be it known that I, JOSEPH ARTESE, a citizen of the United States, residing at Wheatridge, county of Jefferson, and State of Colorado, have invented certain new and useful Improvements in Water Distributing and Regulating Devices; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in means for distributing and regulating the flow of water from an irrigation ditch or lateral, directly to the vegetation or location where the water is to be used, and the device consists, generally speaking, of a metal plate having a relatively small opening therein which is adapted to be wholly or partially closed by a cutoff member consisting of a lever-like device fulcrumed on the plate and adapted to be readily manipulated by the user.

By virtue of this construction it becomes practicable to use a series of these devices to allow the water to pass to various rows of plants and supply each row with the same amount of water. It often happens in irrigating vegetation of this character that the water is under greater pressure at one point than at another and by using a number of these devices, the openings through the plates may be covered by the cutoff parts in varying degrees. For instance, the device located where the pressure of water is greatest, will have exposed a given portion of the opening while the next device which is farther from the point of highest pressure, and where the pressure is consequently less, will have a larger portion of the opening exposed and so on down the lateral and along the rows of vegetation to be supplied with water. In the absence of these devices it has been found that usually it is very difficult to supply the various rows of plants in a contiguous area with equal quantities of water whereby it happens that some of the rows have too large and others too small a supply; and heretofore, so far as I am aware, no regulating device has been devised that will completely overcome the aforesaid difficulty.

Having briefly outlined my improvement I will proceed to describe the same in detail, reference being made to the accompanying drawing in which is illustrated an embodiment thereof.

In this drawing:

Fig. 1 is a view of my improved water distributing and regulating device, the cutoff valve or member being shown in two positions, one in full lines and the other in dotted lines.

Fig. 2 is a section taken on the line 2—2, Fig. 1, viewed in the direction of the arrows.

Fig. 3 is a view illustrating the use of the device and showing a series of said devices on a smaller scale.

The same reference characters indicate the same parts in all the views.

Let the numeral 5 designate my improved device considered in its entirety and composed of a plate 6 having an opening 7 in its central portion; and a cutoff or valve 8 which, as shown in the drawing, consists of a leverlike device fulcrumed on the plate as shown at 9, its lower arm 10 serving to close the opening 7 or leave the same fully or partially open as may be desired. The lever arm 12 above the fulcrum, projects above the top of the plate 6 a sufficient distance to make it easy to manipulate the valve or cutoff for the purpose of regulating the passage of water through the opening 7. As shown in the drawing, the plate 6 is originally in circular form but in the commercial device the upper segment of the plate is preferably turned downwardly at a suitable angle as shown at 13, thus providing a handle and making it easy to remove the devices from the earth and place them in position for controlling the distribution of water.

It will, of course, be understood that these devices may be made of any suitable size. I am of the opinion that the plate members will vary in size for ordinary purposes so that they will be from ten to eighteen inches in diameter while the openings therein will probably be from one and one-half to three inches in diameter. However, it will be understood, as heretofore stated, that the invention is not limited to any particular size either for the plate or the opening therein except that the opening is relatively small as compared with the size of the plate.

In Fig. 3 the area at the right, which I will designate by the numeral 14, illustrates a number of rows of plants along one side of which is located a lateral 15 containing water which is flowing in the direction indicated by the arrows. Six of my improved devices are shown in position and so located that they will permit the flow of water from the lateral 15, between the rows of plants. It is evident from the illustration that the pressure of the water will be greatest at the angle 16 of the stream or lateral and that the device 5 nearest to the point 16 should be so regulated that a smaller portion of the opening 7 will be exposed to the flow of water than at any of the other devices 5 as all of the other devices are farther from the angle 6 of the stream or where the water is first taken out of the lateral for irrigation purposes; hence in regulating the devices the exposed portion of the opening 7 of the device 5 nearest the point 16 will be smallest and the exposed portion of the corresponding openings of the other devices will vary as will be readily understood from the explanation heretofore made.

I claim:

A device of the class described comprising a circular plate having an upper segment bent to form a suitable angle with the body of the plate, a flat cutoff device fulcrumed on the plate below and adjacent the said segment, the said plate having a relatively small opening positioned substantially centrally thereof and adapted to be controlled by the said cutoff, the latter having a part extending above the bent segment of the plate to facilitate manipulation.

In testimony whereof I affix my signature.

JOSEPH ARTESE.